UNSYMMETRICAL MONO-(AMINOALKYLENE)-HYDRAZINES

John H. Biel, Milwaukee, Wis., assignor to Lakeside Laboratories, Inc., a corporation of Delaware
No Drawing. Filed Mar. 21, 1961, Ser. No. 97,160
10 Claims. (Cl. 260—247.5)

This invention relates to novel chemical compounds and processes of preparing the same. More particularly, this invention is concerned with novel hydrazine derivatives and intermediates useful in their production as well as processes for making such compounds.

This application is a continuation-in-part of my copending applications Serial No. 587,464 filed May 28, 1956 and Serial No. 636,491 filed January 28, 1957, both of which are now abandoned.

According to the present invention there are provided novel unsymmetrical aminoalkylidenyl-hydrazines of the formula

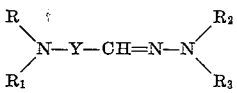

and novel unsymmetrical aminoalkylene-hydrazines of the formula

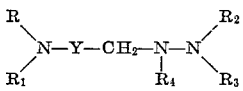

wherein in each occurrence Y represents a lower alkylene group and R, $R_1$, $R_2$ and $R_3$ represent the same or different substituents of the group consisting of lower alkyl groups such as methyl, ethyl, propyl, isopropyl, butyl, pentyl, hexyl and the like; lower alkenyl groups such as the allyl group; aryl groups, particularly where the aryl group is monocyclic such as phenyl, and nuclear-substituted phenyl groups such as hydroxyphenyl, alkoxyphenyl, halophenyl and lower acyloxyphenyl groups such as the chlorophenyl, methoxyphenyl and acetoxyphenyl groups; $R_2$ and $R_3$ are aralkyl groups, particularly those in which the aryl moiety is monocyclic and the alkyl moiety is a lower alkyl group such as benzyl, phenethyl and phenylpropyl; and groups in which R and $R_1$, and $R_2$ and $R_3$, are joined together to form secondary amino groups in which the nitrogen is part of a cyclic group, either monocyclic or polycyclic, such as morpholino, pyrrolidino, piperidino, 1,2,3,4-tetrahydroisoquinolino, 1,2,3,4-tetrahydroquinolino, isoindolino, a 4-lower alkyl-1-piperazino such as 4-methyl-1-piperazino, 3-hydroxypiperidino and 4-hydroxypiperidino; and $R_4$ is hydrogen or a lower acyl group from an aliphatic monocarboxylic acid such as acetyl. In addition to

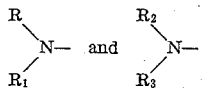

in the above formula being 3-hydroxypiperidino and 4-hydroxypiperidino groups, these moieties may be substituted 3-hydroxypiperidino and substituted 4-hydroxypiperidino groups of the formulae:

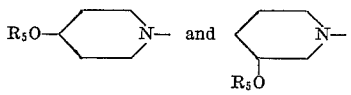

wherein $R_5$ is an N-lower alkyl 3 or 4-piperidyl group such as N-ethyl-3-piperidyl.

Acid addition and quaternary ammonium salts of the compounds described above are also provided.

Some of the compounds of this invention may be produced as the free bases by reacting an appropriate N,N-disubstituted amino-alkylene aldehyde with an appropriate asymmetrically disubstituted hydrazine to produce a corresponding aminoalkylidenyl hydrazine and subsequently reducing it to the desired aminoalkylene hydrazine. This process may be represented as follows:

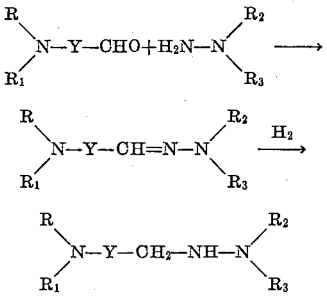

wherein R, $R_1$, $R_2$, $R_3$ and Y have the significance previously assigned.

Some of the starting materials used in this process are disclosed in my copending application Serial No. 636,493 filed January 28, 1957 and now abandoned.

N,N-disubstituted hydrazines such as N,N-dimethylhydrazine, N,N - diethylhydrazine, N,N - dibenzylhydrazine, N,N - diphenethylhydrazine, N-methyl-N-ethylhydrazine, N,N-diallylhydrazine, N-amino-1,2,3,4-tetrahydroisoquinoline, N-amino pyrrolidine, N-amino morpholine, N-aminopiperidine, 1-methyl-4-amino-piperazine, N-amino-1,2,3,4 - tetrahydroquinoline, N-amino-3-hydroxy-piperidine, N-amino isoindoline and N-amino-4-hydroxy piperidine are representative compounds which may be used as reactants in this process.

Typical N,N-disubstituted amino-alkylene aldehydes which may be used are dimethylaminoacetaldehyde, diethylaminoacetaldehyde, N-pyrrolidino-acetaldehyde, N-morpholino - acetaldehyde, N-1,2,3,4-tetrahydroisoquinolino-acetaldehyde, N-isoindolino-acetaldehyde, 3-hydroxy-piperidino-acetaldehyde, N-(4-hydroxy)piperidino-acetaldehyde, N-(3-phenoxy) piperidino-acetaldehyde and 8-morpholino caprylaldehyde.

Reaction of an N,N-disubstituted amino alkylene aldehyde with an asymmetrically disubstituted hydrazine is conveniently effected by contacting the reactants in the presence of water. The reaction proceeds at room temperature although slightly elevated temperatures may be employed to increase the rate of reaction. At room temperature, about 5 to 20 hours is adequate to substantially complete the reaction. Recovery of the desired aminoalkylidenyl hydrazine is conveniently achieved by conventional methods. Thus, the products, generally oils as the free base, may be salted out with an alkali metal hydroxide and extracted with a water immiscible organic solvent such as ether. The product is isolated by distillation under reduced pressure.

Among the novel N,N-disubstituted-N'-(disubstituted aminoalkylidenyl)-hydrazines so produced are N,N-dimethyl-N'-2-(3-hydroxypiperidino)-ethylidenyl hydrazine, N,N-diallyl-N'-3-(4-hydroxypiperidino)-propylidenyl hydrazine, N,N-diethyl-N'-5-(3-hydroxypiperidino)-pentylidenyl hydrazine, N-(2-dimethylamino ethylidenyl)-amino-1,2,3,4-tetrahydroisoquinoline, N-(3-pyrrolidino-propylidenyl)-amino-1,2,3,4-tetrahydroisquinoline, N-(4-morpholinobutylidenyl) - amino - 1,2,3,4 - tetrahydroisoquinoline, N,N-diphenyl-N'-5-(pyrrolidino)-pentylidenyl hydrazine, N-3(piperidino)-propylidenylamino - 1,2,3,4-tetrahydroisoquinoline, N-(2-dimethylaminoethylidenyl)-amino-1,2,3,4-tetrahydroquinoline, N-(2-morpholinoethylidenyl)-amino-1,2,3,4-tetrahydroquinoline, N,N-dimethyl-N'-[(2-N-isoindolino)-ethylidenyl]hydrazine, 1-methyl-4-(6-dimethylaminohexylidenyl)-amino-piperazine, N,N-diphenyl-N'-2-(3-hydroxypiperidino)-ethylidenyl hydrazine, N,N-diphenethyl-N'-6-(4-methoxypiperidino)-hexylidenyl hydrazine, N-4-(4-acetoxypiperidinobutylidenyl)aminopyrrolidine, N,N-dimethyl-N'-[2-(1,2,3,4-tetrahydroisoquinolino)-ethylidenyl]-hydrazine, N-[2-(1,2,3,4-tetrahydroisoquinolino)-ethylidenyl]-aminopyrrolidine, and the like.

The N,N-disubstituted-N'-(disubstituted aminoalkylidenyl)-hydrazines may be reduced to the corresponding aminoalkyl hydrazines by use of a suitable hydrogen providing reducing agent. Lithium aluminum hydride is the preferred reducing agent although others may be used such as catalytic hydrogenation. With lithium aluminum hydride, the reduction may be conveniently effected by intimately combining the reactants in an inert organic solvent such as anhydrous ether, dioxane and tetrahydrofuran. Elevated temperatures such as the reflux temperature enhance the reaction. At reflux temperature, from 1 to 8 hours is usually sufficient to substantially complete the reaction. After the reaction is terminated, water may be added to the mixture to decompose excess lithium aluminum hydride. To recover the product, the organic phase is separated and the aqueous residue extracted with the same solvent. The organic phase and extracts then may be combined, dried, and the product distilled.

Hydrazines, such as those from the hydrazones named above, may be formed in this way.

The hydrazines in which one or both of

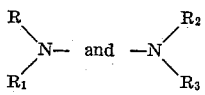

are cyclic secondary amino groups nuclear substituted with a hydroxyl group such as the 3-hydroxypiperidino or 4-hydroxy-piperidino groups may be converted to esters and ethers. The hydroxyl group may be converted to an alkali metal alcoholate and the salt reacted with an acid halide, a lower alkyl halide or a cyclic aryl-lower alkyl halide, such as phenylethyl chloride, to form the corresponding ester or ether. Thus, by reacting N,N-dimethyl-N'-2(3-hydroxypiperidino)ethyl hydrazine sodium salt with methylbromide there is formed N,N-dimethyl-N-2-(3-methoxypiperidino)ethyl hydrazine according to the reaction:

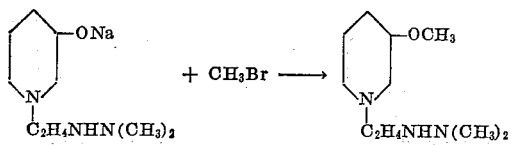

When the sodium salt is reacted with an acetyl halide two reaction products form. Thus, by reacting N,N-dimethyl-N'-2-(3-hydroxypiperidino)ethyl hydrazine sodium salt with acetyl chloride there is formed N,N-dimethyl-N'-2-(3-acetoxypiperidino)-ethylhydrazine and N,N-dimethyl-N'-acetyl-N'-2-(3-hydroxypiperidino)-ethyl hydrazine. This reaction may be represented as follows:

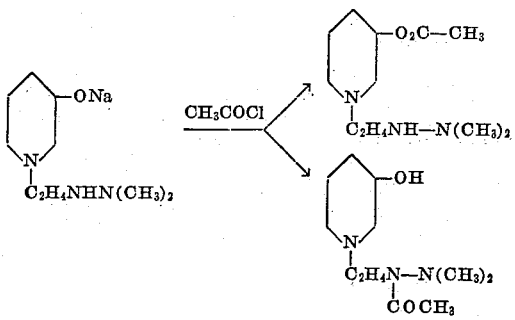

By reacting the alcohol with an acid halide directly there is formed the N'-acyl derivative as follows:

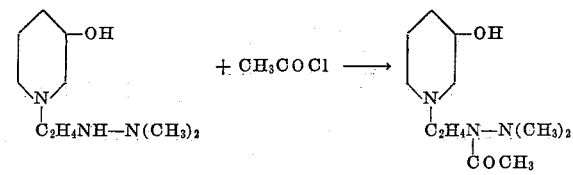

Both the intermediate hydrazones and the ultimate hydrazines of this invention form acid addition salts as well as quaternary ammonium salts.

Acid addition salts are produced by contacting the hydrazones and hydrazines with a suitable acid such as a mineral acid like sulfuric acid or hydrochloric acid or organic acids such as formic acid, citric acid, maleic acid and complex acids such as penicillin. Generally, two equivalents of acid combine with one mole of the hydrazine and one equivalent of acid combines with one mole of the hydrazone.

Quaternary ammonium salts are readily produced by contacting the hydrazones and hydrazines with lower alkyl and aralkyl esters of mineral and organic acids, preferably in the presence of an organic solvent. Examples of such compounds which may be reacted with the hydrazones and hydrazines to form the quaternary salts thereof are di-lower alkyl sulfates such as dimethyl sulfate and lower alkyl halides such as methyl chloride, ethyl bromide, and methyl iodide, and others such as phenyl-lower alkyl halides including o-chlorobenzyl bromide, phenylethyl chloride and phenylpropyl bromide. Up to two equivalents of such compounds may be reacted with the hydrazines to form the salts.

The nontoxic acid addition salts of the hydrazines possess diuretic properties while the quaternary ammonium salts possess hypotensive or blood-pressure lowering properties. In such uses, the salts are employed in conventional pharmaceutical forms including tablets, capsules, powders and solutions, preferably formulated into unit-dosage forms.

The following examples are presented to show methods of producing certain of the novel compounds included within this invention. It is to be understood, however, that these examples are included only for purposes of illustration, and that the invention is not to be restricted to the embodiments specifically disclosed therein.

EXAMPLE 1

*N-(2-Dimethylamino Ethylidenyl)-Amino-1,2,3,4-Tetrahydroisoquinoline*

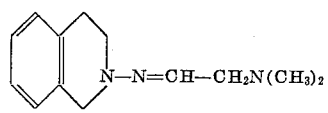

To an aqueous solution containing 0.155 mole of dimethylaminoacetaldehyde was added 23.0 g. (0.155 mole) of N-amino-1,2,3,4-tetrahydroisoquinoline in 100 cc. of water. The mixture was allowed to stand for 20 hours at room temperature. The product was salted out by the addition of solid potassium hydroxide and was then extracted with ether. The ether extracts were dried with potassium carbonate and the product collected by distillation at 120–125° C. (0.02 mm.); yield 28.4 g. (85%).

*Analysis.*—Calcd. for $C_{13}H_{19}N_3$: Titratable N, 12.90. Found: Titratable N, 12.81.

EXAMPLE 2

*N-(2-Dimethylaminoethylidenyl)-Amino-1,2,3,4-Tetrahydroisoquinoline Methiodide*

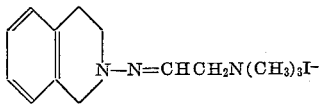

To 2.17 g. of the base (Example 1) in 15 cc. of dry ether was added a solution of 4.3 g. of methyliodide in 75 cc. of dry ether. The white crystalline compound was separated by filtration; yield 3.3 g. (92%); M.P. 151° C. dec.

*Analysis.*—Calcd. for $C_{14}H_{22}IN_3$: I, 35.33. Found: I, 34.96.

EXAMPLE 3

*N-(2-Dimethylaminoethyl)-Amino-1,2,3,4-Tetrahydroisoquinoline*

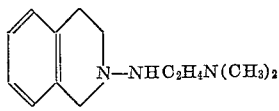

To 3.4 g. of lithium aluminum hydride in 200 cc. of dry ether was added 21.7 g. (0.10 mole) of the ethylidene derivative (Example 1) dissolved in 150 cc. of anhydrous ether. The mixture was stirred and refluxed for six hours, after which it was treated with 30 cc. of 40% aqueous potassium hydroxide. The ether layer was decanted and the aqueous phase extracted several times with ether; the combined ether extracts were dried with potassium carbonate and the product collected by distillation at 105° C. (0.025 mm.); yield 21.4 g. (98%).

*Analysis.*—Calcd. for $C_{13}H_{21}N_3$: Titratable N, 12.78. Found: N, 12.27.

EXAMPLE 4

*N-(2-Dimethylaminoethyl)-Amino-1,2,3,4-Tetrahydroisoquinoline Dihydrochloride*

To 8.76 g. (0.04 mole) of the base (Example 3) dissolved in 200 cc. of isopropyl alcohol was added ethereal hydrochloric acid to pH 5; yield 8.0 g.; M.P. 200–201° C.

*Analysis.*—Calcd. for $C_{13}H_{23}Cl_2N_3$: Cl, 24.26. Found: Cl, 24.27.

EXAMPLE 5

*N-(2-Dimethylaminoethyl)-Amino-1,2,3,4-Tetrahydroisoquinoline Dimethiodide*

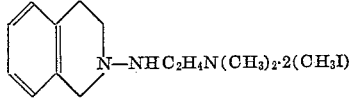

To 9.2 g. of the base (Example 3) in 250 cc. of isopropyl alcohol was added 28 g. methyl iodide. The mixture was stirred at 80° C. for 8 hours. The isopropyl alcohol was removed by distillation in vacuo and the residue crystallized from acetonitrile.

*Analysis.*—Calcd. for $C_{15}H_{27}I_2N_3$: I, 50.44. Found: I, 49.57.

EXAMPLE 6

*N-(2-Diethylaminoethylidenyl)-Amino-1,2,3,4-Tetrahydroisoquinoline*

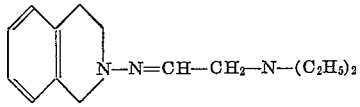

This compound was prepared in 86% yield from diethylaminoacetaldehyde and N-amino-1,2,3,4-tetrahydroisoquinoline according to the procedure described in Example 1; B.P. 135–138° C. (0.06 mm.) $N_D^{20}$ 1.5462.

*Analysis.*—Calcd. for $C_{15}H_{23}N_3$: Titratable N, 5.71. Found: N, 5.75.

EXAMPLE 7

*N-(2-Diethylaminoethyl)-Amino-1,2,3,4-Tetrahydroisoquinoline*

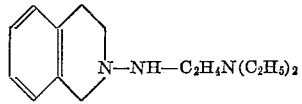

This compound was prepared by the reduction of the ethylidene derivative of Example 6 with lithium aluminum hydride (see Example 3 for procedure); yield 86%; B.P. 130–140° C. (0.06 mm.).

*Analysis.*—Calcd. for $C_{15}H_{23}N_3$: Titratable N, 11.32. Found: N, 11.32.

EXAMPLE 8

*N-(2-Diethylaminoethyl)-Amino-1,2,3,4-Tetrahydroisoquinoline Dimethiodide*

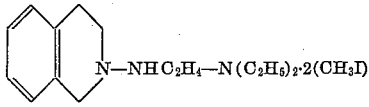

A solution containing 2.47 g. (0.010 mole) of the base (Example 2) in 10 cc. of acetonitrile was added to a solution of 6.7 g. (0.047 mole) of methyliodide in 15 cc. of acetonitrile and the mixture gently refluxed for three hours. On standing at room temperature a crystalline solid separated; yield 2.8 g. (54%); M.P. 190–192° C.

*Analysis.*—Calcd. for $C_{17}H_{31}I_2N_3$: I, 47.78. Found: I, 47.40.

EXAMPLE 9

*N-(2-Pyrrolidinoethylidenyl)-Amino-1,2,3,4-Tetrahydroisoquinoline*

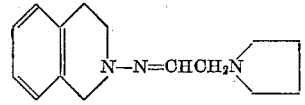

This compound was prepared from pyrrolidino-acetaldehyde and the appropriate N-aminotetrahydroisoquinoline according to Example 1; yield 87%; B.P. 144–147° C. (0.03 mm.).

*Analysis.*—Calcd. for $C_{15}H_{21}N_3$: Titratable N, 11.51. Found: N, 11.95.

EXAMPLE 10

*N-(2-Pyrrolidinoethyl)-Amino-1,2,3,4-Tetrahydroisoquinoline*

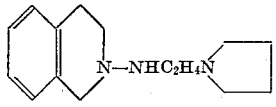

This compound was obtained in a 63% yield by the reduction of the ethylidene derivative of Example 9 with lithium aluminum hydride (of Example 3); B.P. 150–152° C. (0.08 mm.).

*Analysis.*—Calcd. for $C_{15}H_{23}N_3$: Titratable N, 11.42. Found: N, 11.37.

EXAMPLE 11

*N-(2-Pyrrolidinoethyl)-Amino-1,2,3,4-Tetrahydroisoquinoline Dimethiodide*

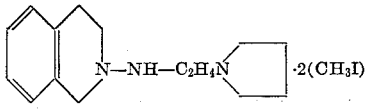

The dimethiodide salt was prepared in acetonitrile from the base of Example 10, M.P. 197–200° C.

*Analysis.*—Calcd. for $C_{17}H_{29}I_2N_3$: I, 47.96; N (titratable), 5.29. Found: I, 46.69; N (titratable), 5.30.

EXAMPLE 12

*N-(Morpholinoethylidenyl)-Amino-1,2,3,4-tetrahydroiso-
quinoline*

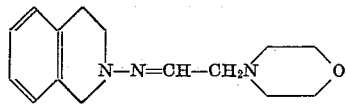

This compound was prepared from morpholino-acetaldehyde and the appropriate N-amino-tetrahydroisoquinoline according to Example 1; yield 99.8%.

EXAMPLE 13

*N-(Morpholinoethyl)-Amino-1,2,3,4-Tetrahydroiso-
quinoline*

The ethylidene derivative of Example 12 was reduced with lithium aluminum hydride in ether, yield 69%; B.P. 136–139° C. (0.03 mm.), $N_D^{20}$ 1.5489.

*Analysis.*—Calcd. for $C_{15}H_{25}N_3O$: N (titratable), 10.75. Found: N, 10.67.

EXAMPLE 14

*N-(Morpholinoethyl)-Amino-1,2,3,4-Tetrahydroiso-
quinoline Dimethiodide*

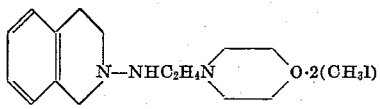

The dimethiodide salt was prepared from the base of Example 13; M.P. 189–190° C.

*Analysis.*—Calcd. for $C_{17}H_{31}I_2N_3O$: I, 46.55; N titratable), 5.14. Found: I, 43.51; N (titratable), 4.83.

EXAMPLE 15

*N,N-Dimethyl-N'-(N-1,2,3,4-Tetrahydroisoquinolino-
Ethylidenyl Hydrazine*

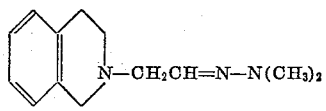

N-1,2,3,4-tetrahydroisoquinolinoacetal (27.0 g.) was added slowly to a cold mixture of 150 cc. of concentrated aqueous hydrochloric acid and 5 cc. of water. The solution was allowed to stand at room temperature for 20 hours and then concentrated to dryness in vacuo. The residue was taken up in 125 cc. of water and 50 cc. dioxane and neutralized with 8.2 cc. of 20% sodium hydroxide (pH 6.5). To this solution was added with stirring and cooling 6.3 g. of unsymmetrical dimethylhydrazine dissolved in 75 cc. of aqueous dioxane. Stirred at room temperature for 20 hours. The product was salted out by the addition of solid potassium hydroxide and extracted with ether. The ether extracts were dried with potassium carbonate. The product was collected by fractional distillation at 120° C. (0.03 mm.); yield 16 g. (74%); $N_D^{20}$ 1.5576.

*Analysis.*—Calcd. for $C_{13}H_{19}N_3$: N (titratable), 12.90. Found: N, 12.31.

EXAMPLE 16

*N,N-Dimethyl-N'-(N-1,2,3,4-Tetrahydroisoquinolino)-
Ethyl Hydrazine*

The ethylidene derivative of Example 15 was reduced with LiAlH₄ in ether (cf. Example 3); yield 80%; B.P. 90° C. (0.03 mm.); $N_D^{20}$ 1.5352.

*Analysis.*—Calcd. for $C_{13}H_{21}N_3$: N (titratable), 12.78. Found: N, 12.59.

EXAMPLE 17

*N,N-Dimethyl-N'-(N-1,2,3,4-Tetrahydroisoquinolino)-
Ethylhydrazine Dimethiodide*

This salt was prepared from 7.3 g. of the base (Example 16) and 18.7 g. methyl iodide in 200 cc. of absolute ethanol by gently refluxing the solution for two hours. The gummy residue which remained after evaporation of the solvent was crystallized from acetonitrile (200 cc.); yield 8.4 g., m.p. 210–211° C.

*Analysis.*—Calcd. for $C_{15}H_{27}I_2N_3$: I, 50.44. Found: I, 50.64.

EXAMPLE 18

*N,N-Diethyl-N'-(N-1,2,3,4-Tetrahydroisoquinolino)-
Ethylidenylhydrazine*

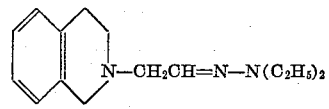

A solution containing 0.20 mole of N-1,2,3,4-tetrahydroisoquinolino-acetaldehyde hydrochloride in 300 cc. of water was neutralized with 15 cc. 20% sodium hydroxide solution to pH 6 while keeping the temperature between 10–15° C. To this solution was then added 17.6 g. (0.20 mole) of unsymmetrical diethylhydrazine in 100 cc. water while keeping the temperature of the reaction mixture below 15° C. The solution was allowed to stand at room temperature for twenty hours and the product salted out by the addition of solid potassium hydroxide. The oily layer was removed by ether extraction and the combined ether extracts dried with potassium carbonate. The product was collected by distillation at 135–138° C. (0.04 mm.); yield 34.2 g. (70%).

*Analysis.*—Calcd. for $C_{15}H_{23}N_3$: N (titratable), 11.42. Found: N, 11.26.

EXAMPLE 19

*N,N-Diethyl-N'-(N-1,2,3,4-Tetrahydroisoquinolino)-
Ethylhydrazine*

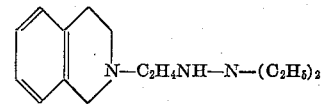

The ethylidene derivative of Example 18 was reduced with lithium aluminum hydride in ether (Example 3); yield 76%; B.P. 131–135° C. (0.10 mm.), $N_D^{20}$ 1.5350.

*Analysis.*—Calcd. for $C_{15}H_{25}N_3$: N (titratable), 11.32. Found: N, 11.54.

EXAMPLE 20

*N,N-Diethyl-N'-(N-1,2,3,4-Tetrahydroisoquinolino)-
Ethylhydrazine Dimethiodide*

The base (Example 19) was mixed with excess methyl iodide in acetonitrile, m.p. 186–192° C. dec.

*Analysis.*—Calcd. for $C_{17}H_{31}I_2N_3$: I, 47.78; N (titratable) 5.27. Found: I, 46.64; N, 5.38.

EXAMPLE 21

*N-Tetramethylene-N'-(1,2,3,4-Tetrahydroisoquinolino)-
Ethylidenylhydrazine*

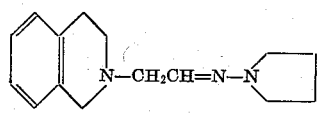

The procedure for the preparation of this compound is identical with that described under Example 18; B.P. 163–165° C. (0.075 mm.); $N_D^{20}$ 1.5727; yield 56.9%.

*Analysis.*—Calcd. for $C_{15}H_{21}N_3$: N (titratable), 11.52. Found: N, 11.42.

EXAMPLE 22

*N-Tetramethylene-N'-(N-1,2,3,4-Tetrahydroiso-quinolino)-Ethyl-Hydrazine*

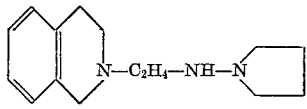

This compound was prepared from its ethylidene derivative (Example 21) by the LiAlH₄ reduction (Example 3); B.P. 160–166° C. (0.2 mm.); $N_D^{20}$ 1.5551.; yield 77%.

*Analysis.*—Calcd. for $C_{15}H_{23}N_3$: N (titratable), 11.42. Found: N, 11.17.

EXAMPLE 23

*N-Tetramethylene-N'-(N-1,2,3,4-Tetrahydroisoquinolino)-Ethylhydrazine Dimethiodide*

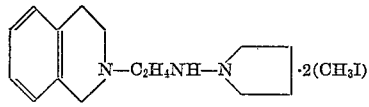

M.P. 197–199° C.

*Analysis.*—Calcd. for $C_{17}H_{29}I_2N_3$: I, 47.96. Found: I, 46.17.

EXAMPLE 24

*N-4-Morpholino-N-[2-(N'-1,2,3,4-Tetrahydro-isoquinolino)]-Ethylamine*

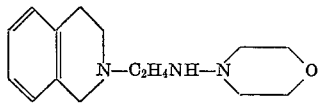

The ethylidene derivative was prepared in the usual manner (cf. Example 12) and reduced with lithium aluminum hydride in ether, B.P. 160–163° C. (0.04 mm.); yield 79%, $N_D^{20}$ 1.5492.

*Analysis.*—Calcd. for $C_{15}H_{23}N_2O$: N (titratable), 10.72. Found: N, 10.64.

EXAMPLE 25

*N-4-Morpholino-N-[2-(N'-1,2,3,4-Tetrahydroiso-quinolino)]-Ethylamino Dimethiodide*

This salt was prepared in acetonitrile from the base (Example 24) and excess methyl iodide, M.P. 189–191° C.

*Analysis.*—Calcd. for $C_{17}H_{29}I_2N_3O$: I, 46.55. Found: I, 46.22.

EXAMPLE 26

*N-Pentamethylene-N'-[2-(N'-1,2,3,4-Tetrahydroiso-quinolino)]-Ethylidenylhydrazine*

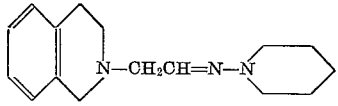

This compound was prepared in 100% yield from N-tetrahydroisoquinolino-acetaldehyde hydrochloride and N-aminopiperidine according to the directions in Example 18. The base was not distilled.

*Analysis.*—Calcd. for $C_{16}H_{23}N_3$: N (titratable), 10.80. Found: N, 10.63.

EXAMPLE 27

*N-Pentamethylene-N'-[2-(N-1,2,3,4-Tetrahydro-isoquinolino)]-Ethylhydrazine*

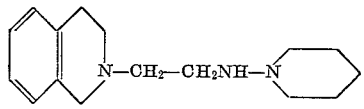

The base of Example 26 was reduced as in Example 3; yield 79%; B.P. 160° C. (0.05 mm.); $N_D^{20}$ 1.5460.

*Analysis.*—Calcd. for $C_{16}H_{25}N_3$: N (titratable), 10.80. Found: N, 10.89.

EXAMPLE 28

*N-Pentamethylene-N'-[2-(N-1,2,3,4-Tetrahydroisoquino-lino)]-Ethylhydrazine Dimethiodide*

The salt was prepared from the base of Example 27, M.P. 216.5° C.

*Analysis.*—Calcd. for $C_{18}H_{31}I_2N_3$: I, 46.72; N, 5.16. Found: I, 46.01; N, 5.15.

EXAMPLE 29

*N-(2-Dimethylaminoethylidenyl)-Amino-1,2,3,4-Tetrahydroquinoline*

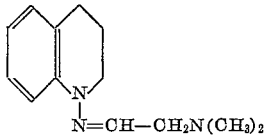

This compound was prepared from the appropriate reactants according to the procedure outlined in Example 1; B.P. 120° C. (0.05 mm.); yield 79%.

*Analysis.*—Calcd. for $C_{13}H_{19}N_3$: N (titratable), 6.45. Found: N, 6.40.

EXAMPLE 30

*N - (2 - Dimethylaminoethyl) - Amino - 1,2,3,4-Tetrahydroquinoline*

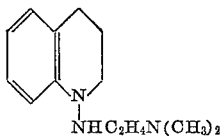

The ethylidene base of Example 29 was reduced in the usual manner, B.P. 112° C. (0.025 mm.); $N_D^{20}$ 1.5531; yield 83%.

*Analysis.*—Calcd. for $C_{13}H_{21}N_3$: N (titratable), 6.39. Found: N, 6.23.

The dihydrochloride salt was prepared and melted at 167–168° C.

*Analysis.*—Calcd. for $C_{13}H_{23}Cl_2N_2$: Cl, 24.26. Found: Cl, 24.27.

The dimethiodide salt was prepared and melted at 160–164° C.

*Analysis.*—Calcd. for $C_{15}H_{27}I_2N_3$: I, 50.44. Found: I, 49.98.

EXAMPLE 31

*N - (2 - Diethylaminoethylidenyl) - Amino-1,2,3,4-Tetra-hydroquinoline*

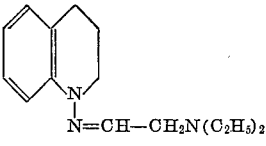

Prepared in the manner described in Example 1; B.P. 153° C. (0.05 mm.); $N_D^{20}$ 1.5770; yield 75%.

*Analysis.*—Calcd. for $C_{15}H_{23}N_3$: N (titratable), 5.71. Found: N, 5.84.

EXAMPLE 32

*N - (2 - Diethylaminoethyl) - Amino - 1,2,3,4-Tetrahydroquinoline*

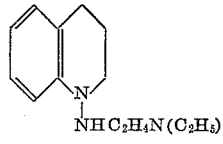

Reduction of base in Example 31 yielded the desired compound; B.P. 135° C. (0.05 mm.); $N_D^{20}$ 1.5419; yield 84%.

*Analysis*—Calcd. for $C_{15}H_{25}N_3$: N (titratable), 5.66. Found: N, 5.54.

The dimethiodide salt was prepared and melted at 141–142° C.

*Analysis.*—Calcd. for $C_{17}H_{31}I_2N_3$: I, 47.77 N (titratable), 5.31. Found: I, 46.63; N (titratable), 5.69.

EXAMPLE 33

N - [2 - (Morpholino) - Ethylidenyl] - Amino - 1,2,3,4-Tetrahydroquinoline

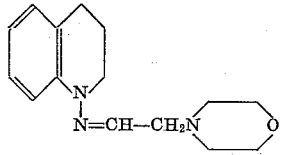

Prepared by procedure of Example 1; the base was not distilled; yield 96%; M.P. 76° C.

*Analysis.*—Calcd. for $C_{15}H_{21}N_3O$: N (titratable), 5.40. Found: N, 5.63.

EXAMPLE 34

N - [2-(Morpholino) - Ethyl] - Amino - 1,2,3,4 - Tetrahydroquinoline

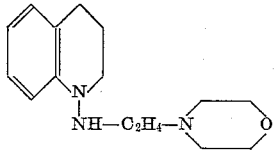

The base of Example 33 was reduced with $LiAlH_4$ as in Example 3; B.P. 164° C. (0.04 mm.). $N_D^{20}$ 1.5644.

*Analysis.*—Calcd. for $C_{15}H_{23}N_3O$: N (titratable), 5.36. Found: N, 5.54.

EXAMPLE 35

N - (2 - N - Pyrrolidyl) - Ethylidenylamino - 1,2,3,4-Tetrahydroquinoline

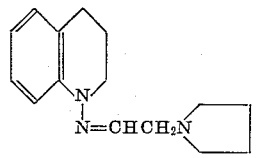

Prepared as per Example 1; B.P. 171° C. (0.05 mm.); $N_D^{20}$ 1.6000; yield 87%.

*Analysis.*—Calcd. for $C_{15}H_{21}N_3$: N (titratable), 5.76. Found: N, 5.96.

EXAMPLE 36

N - (2 - Pyrrolidylethyl) - Amino - 1,2,3,4 - Tetrahydroquinoline

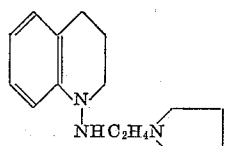

This compound was obtained by the reduction of the base (Example 35) with $LiAlH_4$ as in Example 3, B.P. 142–143° C. (0.03 mm.). $N_D^{20}$ 1.5607; yield 87%.

*Analysis.*—Calcd. for $C_{15}H_{23}N_3$: N (titratable), 5.70. Found: N, 5.60.

The dimethiodide salt was prepared in acetonitrile and melted at 138° C.

*Analysis.*—Calcd. for $C_{17}H_{29}I_2N_3$: I, 47.96; N (titratable), 5.29. Found: I, 47.58; N (titratable), 5.50.

EXAMPLE 37

N,N - Dimethyl - N' - [(2 - N - isoindolino) - Ethylidenyl] Hydrazine

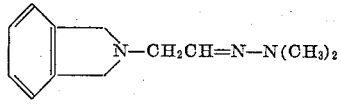

The compound was prepared from isoindolinoacetaldehyde and unsymmetrical dimethylhydrazine by the procedure outlined in Example 18; B.P. 115° C. (0.05 mm.); yield 75%.

*Analysis*—Calcd. for $C_{12}H_{17}N_3$: N (titratable), 13.78. Found: N, 13.21.

EXAMPLE 38

N,N-Dimethyl-N'-(2'-N-Isoindolino)-Ethyl-Hydrazine

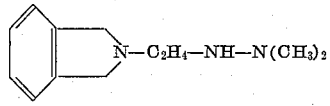

The ethylidene base of Example 37 was reduced with $LiAlH_4$ in ether (cf. Example 3); B.P. 114° C. (0.05 mm.); yield 75%; $N_D^{20}$ 1.5366.

*Analysis.*—Calcd. for $C_{12}H_{19}N_3$: N (titratable), 13.64. Found: N, 13.15.

EXAMPLE 39

N,N-Dimethyl-N'-(2'-N-Isoindolino)-Ethyl-Hydrazine Trimaleate

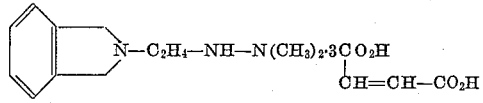

Added a solution of 6.4 g. of the base (Example 38) in 50 cc. of ethanol to 11.6 g. of maleic acid in 50 cc. of ethanol. The precipitate was removed by filtration, M.P. 157–159° C. Maleic acid content calcd.: 63.23. Found: 64.10.

EXAMPLE 40

1-Methyl-4-(2-Dimethylaminoethylidenyl)-aminopiperazine

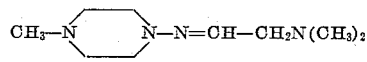

To 0.243 mole of 2-dimethylaminoacetaldehyde hydrochloride in water was added 0.243 mole of 20% aqueous sodium hydroxide solution and then 27.9 g. of 1-methyl-4-aminopiperazine in 100 cc. of water. After standing for twenty hours, solid potassium hydroxide was added and the upper layer removed by ether extraction. The ether extracts were dried with potassium carbonate and the product collected at 72° C. (25 mm.); yield 37.5 g.; $N_D^{20}$ 1.4938.

EXAMPLE 41

1-Methyl-4-(2-Dimethylaminoethyl)-Amino-Piperazine

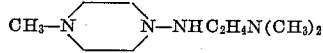

The ethylidene derivative of Example 40 was reduced with lithium aluminum hydride in ether and the product collected at 58° C. (0.2 mm).

*Analysis.*—Calcd. for $C_9H_{22}N_4$: N (titrated), 15.04. Found: N, 15.22.

EXAMPLE 42

1-Methyl-4-(2-Dimethylaminoethyl)-Amino-Piperazine Dimethiodide

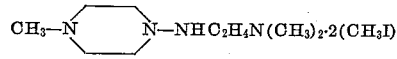

To 15 g. of methyliodide in 300 cc. of methanol was added 5.6 g. of base (Example 41) in 75 cc. of methanol. Heated 60–70° C. for 2.5 hours. The product was removed by filtration; yield 11.8 g.; M.P. 257° C.

*Analysis.*—Calcd. for $C_{11}H_{28}I_2N_4$: I, 53.98. Found: I, 53.45.

EXAMPLE 43

*1-Methyl-4-(2-Dimethylaminoethyl)-Amino-Piperazine Trimaleate*

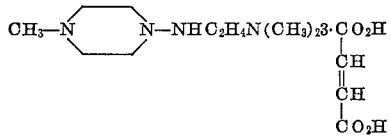

To 9.3 g. of maleic acid in 35 cc. of ethyl alcohol was added 3.7 g. of the base (Example 41); yield 10.4 g.; recrystallized from 400 cc. methanol and 50 cc. methanol; M.P. 160–161° C.

Neutralization Equivalent : 534.4. Found: N.E. 551.

EXAMPLE 44

*3-Hydroxypiperidine Acetal*

A mixture of 68 g. (0.67 mole) of 3-hydroxypiperidine, 67 g. (0.67 mole) triethylamine, 132 g. (0.67 mole) bromoacetal and 400 cc. dry toluene was refluxed for four hours. The triethylamine hydrobromide was filtered off, washed with toluene, dried and weighed 33.1 g. (theory 122 g.). The filtrate was washed several times with saturated potassium carbonate solution and dried briefly over anhydrous potassium carbonate. The toluene was distilled off under vacuum with a water bath, and the product distilled at 98–100° C. at 0.6 mm.; yield 90.95 g. or 62.5% $N_D^{25}$ 1.4632.

*Analysis.*—Calcd. for $C_{11}H_{23}NO_3$: N, 6.44. Found: N, 6.65.

EXAMPLE 45

*N,N-Dimethyl-N'-2-(3-Hydroxypiperidino)-Ethylidenyl Hydrazine*

32.6 g. (0.15 mole) of 3-hydroxypiperidinoacetal was added in fifteen minutes to 150 cc. of concentrated hydrochloric acid at 5–10° C. After standing overnight at room temperature, the excess hydrochloric acid and water was distilled off under vacuum on a 50° C. water bath. The residue was diluted to 150 cc. volume with distilled water and neutralized to pH–7 with 14 g. (20%) of sodium hydroxide solution. 9 grams (0.15 mole) of unsymmetrical dimethyl hydrazine was added at 5° C. The solution stood overnight at 25° C. It was saturated with sodium hydroxide with cooling, and the organic material was extracted with four 75 cc. portions of ether. The combined extracts were dried briefly over anhydrous potassium carbonate. The ether was distilled off through a 10" Vigreux column and the product distilled at 111–112° C. at 0.25 mm.; yield: 18.45 g. or 66.8% $N_D^{25}$ 1.5126.

*Analysis.*—Calcd. for $C_9H_{19}N_3O$: N, 15.12. Found: 15.41.

EXAMPLE 46

*N,N-Dimethyl-N'-2-(3-Hydroxypiperidino)-Ethyl Hydrazine*

To 5.7 g. (0.15 mole) of lithium aluminum hydride in 100 cc. anhydrous ether was added 18 g. (0.097 mole) of N,N - dimethyl - N'-2-(3-hydroxypiperidino)-ethylidenyl hydrazine dissolved in 100 cc. anhydrous ether. The mixture was refluxed for four hours after the addition. The complex was decomposed with 20 cc. (40%) potassium hydroxide. The organic material was decanted off the inorganic salts, which were washed several times with ether. The combined organic material was dried briefly over anhydrous potassium carbonate. The ether was distilled off through a 5" Vigreux column, and the residue was vacuum distilled; B.P. 108–109° C. at 0.45 mm.; yield: 15.75 g. or 86.8% $N_D^{25}$ 1.4911.

*Analysis.*—Calcd. for $C_9H_{21}N_3O$: N, 14.95. Found: N, 14.93.

EXAMPLE 47

*Alpha-(4-Hydroxypiperidino)-Diethylacetal*

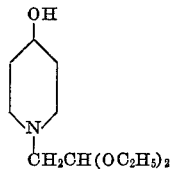

This compound was prepared from bromoacetal and 4-hydroxypiperidine in 46% yield; B.P. 112–118° C. (0.60 mm.); $N_D^{25}$ 1.4672.

*Analysis.*—Calcd. for $C_{11}H_{23}NO_3$: N, 6.44. Found: N, 7.00.

EXAMPLE 48

*N,N-Dimethyl-N'-2-(4-Hydroxypiperidino)-Ethylidenyl Hydrazine*

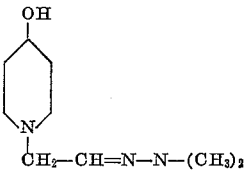

The compound was prepared according to Example 45 from 4-hydroxypiperidinoacetal and dimethylhydrazine in 78% yield; B.P. 112–114° C. (0.20 mm.); $N_D^{25}$ 1.5163.

*Analysis.*—Calcd. for $C_9H_{19}N_3O$: N, 15.12. Found: N, 15.22.

EXAMPLE 49

*N,N-Dimethyl-N'-2-(4-Hydroxypiperidino)-Ethyl-Hydrazine*

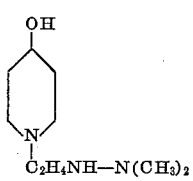

This compound was synthesized according to Example 46 in 82% yield by the lithium aluminum hydride reduction of the above ethylidene derivative; B.P. 102–103° C. (0.20 mm.); $N_D^{25}$ 1.4947.

*Analysis.*—Calcd. for $C_9H_{21}N_3O$: N, 14.95. Found: N, 14.92.

EXAMPLE 50

*N,N-Dimethyl-N'-2-(3-Hydroxypiperidino)-Ethyl-Hydrazine Dimethobromide*

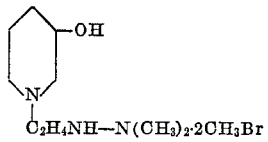

A mixture containing 6 g. (0.032 mole) of the base and 6.7 g. (0.07 mole) of methyl bromide in 25 cc. of isopropyl alcohol was allowed to stand at room temperature for sixteen hours. An oil precipitated which was crystallized from acetonitrile; M.P. 201–202° C.

*Analysis.*—Calcd. for $C_{11}H_{27}Br_2N_3$: Br, 42.4; N, 7.42. Found: Br, 41.7; N, 7.80.

EXAMPLE 51

N,N-Dimethyl-N'-2-(3-Hydroxypiperidino)-Ethyl Hydrazine Bis Maleate

To 11.6 g. (0.1 mole) of maleic acid dissolved in 50 cc. ethyl alcohol was added 9.36 g. (0.05 mole) of N,N-dimethyl-N'-2-(3-hydroxypiperidyl)-ethyl hydrazine diluted with 50 cc. of anhydrous ether. The solid was filtered off, washed thoroughly with alcohol and dried; yield: 18.45 g. or 88%; M.P. 115–116° C. (dec.)

*Analysis.*—Calcd. for $C_{17}H_{29}N_3O_9$: N, 6.68; N.E., 104.85. Found: N, 6.72; N.E., 103.24.

EXAMPLE 52

N-(2-Pyrrolidinoethylidenyl)-Amino-3-Hydroxy-Piperidine

To 100 cc. of concentrated hydrochloric acid at 5–10° C. was added 18.7 g. (0.1 mole) of N-pyrrolidino acetal. The mixture was kept at room temperature overnight. The solution was concentrated to dryness with a 50° C. water bath under vacuum. The residue was diluted to 100 cc. with distilled water and neutralized to pH–7 with the calculated amount of 20% sodium hydroxide solution, 11.47 g. (0.099 mole) of N-amino 3-hydroxypiperidine dissolved in 25 cc. water was added at 5–10° C. The solution stood overnight at room temperature. It was saturated with potassium hydroxide with cooling, and the oil was extracted from the aqueous layer with three 100 cc. portions of tetrahydrofuran. The extracts were dried briefly over anhydrous potassium carbonate. The solvent was distilled off through a 10" Vigreux column, and the residue was vacuum distilled; B.P. 150–151° C. at 0.08 mm.; yield 15.21 g. or 75.7%.

*Analysis.*—Calcd. for $C_{11}H_{21}N_3O$: N, 13.26. Found: N, 13.56.

EXAMPLE 53

N-(2-Pyrrolidinoethyl)-Amino-3-Hydroxypiperidine

To 2.74 g. (0.072 mole) of lithium aluminum hydride in 50 cc. of tetrahydrofuran was added 15.21 g. (0.072 mole) of N-(3-hydroxypiperidyl)-N'-[2-pyrrolidino)-ethylidenyl]-hydrazine dissolved in 100 cc. of tetrahydrofuran. The mixture was refluxed for four hours. The excess lithium aluminum hydride was decomposed with the addition of 10 cc. water, and the complex was decomposed with 12 cc. 40%) potassium hydroxide solution. The organic material was decanted off the inorganic salts which were washed with tetrahydrofuran. The combined extracts were dried over anhydrous potassium carbonate. The solvent was distilled off through a 10" Vigreux column and the product was vacuum distilled; B.P. 117–119° C. at 0.01 mm.; yield 12.37 g. or 80.6%.

*Analysis.*—Calcd. for $C_{11}H_{23}N_3O$: N, 13.14. Found: N, 13.05.

EXAMPLE 54

The following compounds (hydrazones) were prepared according to the described procedures employing the appropriate reactants to give the desired end product.

N,N-Disubstituted-N'-2-(3-Hydroxypiperidino Eethylidenyl)-Hydrazines

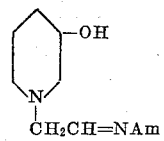

| | Am | B.P., °C./mm | $N_D^{25}$ | Percent Yield | Formula | Assays, Nitrogen | |
|---|---|---|---|---|---|---|---|
| | | | | | | Calcd. | Found |
| 1 | $(CH_3)_2N-$ | 111–112/0.27 | 1.5126 | 66.8 | $C_9H_{19}N_3O$ | 15.12 | 15.41 |
| 2 | pyrrolidinyl-N– | 140–143/0.02 | | 53.8 | $C_{11}H_{21}N_3O$ | 13.26 | 13.12 |
| 3 | morpholinyl-N– | (M.P. 101–103) | | 95.2 | $C_{11}H_{21}N_3O_2$ | 6.16 | 7.37 |
| 4 | $CH_3$-CH$_2$N-(o-Cl-phenyl) | 185–190/0.15 | | 55.8 | $C_{15}H_{22}ClN_3O$ | 9.48 | 7.00 |
| 5 | $CH_3N$(piperazinyl)-N– | 167–169/0.025 | | 82.5 | $C_{12}H_{24}N_4O$ | 11.65 | 12.48 |

N-Amino-N-methyl o-chlorobenzylamine was used as a reactant to form compound 4. This reactant has the formula

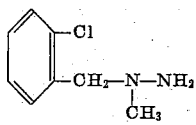

and was prepared as follows:

To 17.5 g. (0.45 mole) lithium aluminum hydride in 450 cc. of tetrahydrofuran was added 83 g. (0.45 mole)

N-nitroso-N-methyl o-chlorobenzylamine dissolved in 200 cc. of tetrahydrofuran. The mixture was refluxed with stirring for three hours; the complex was then decomposed with 60 cc. (40%) aqueous KOH solution, the organic layer was decanted and the inorganic salts extracted repeatedly with tetrahydrofuran. The combined extracts were dried with potassium carbonate and the product collected by fractional distillation; B.P. 84–87° C. (1.2 mm.); yield: 42 g. (56%); $N_D^{25}$ 1.5522.

*Analysis.*—Calcd. for $C_8H_{11}ClN_2$: Cl, 21.03; N (non-aqueous titration) 8.33. Found: Cl, 20.96; N (non-aqueous titration) 8.20.

EXAMPLE 55

*N-(N′,N′-Disubstituted Amino-Ethylidenyl)-Amino-3-Hydroxypiperidines*

The following compounds were also prepared:

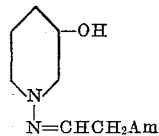

N=CHCH₂Am

| Am | B.P., °C./mm. | Percent Yield | Formula | Assays, Nitrogen Calcd. | Assays, Nitrogen Found |
|---|---|---|---|---|---|
| $(CH_3)_2N-$ | 126–128/0.05 | 53.9 | $C_9H_{19}N_3O$ | 15.12 | 14.51 |
| piperidino-N- | 150–151/0.08 | 75.7 | $C_{11}H_{21}N_3O$ | 13.26 | 13.56 |
| morpholino-N- | | 73.7 | $C_{11}H_{21}N_3O_2$ | 12.32 | 12.59 |
| o-Cl-benzyl-N(CH₃)- | 180–185/0.05 | 34.4 | $C_{15}H_{22}N_3ClO$ | 9.48 | 9.93 |

EXAMPLE 56

*N,N-Disubstituted-N′-2-(3-Hydroxypiperidino)-Ethyl Hydrazines*

The following compounds were also produced:

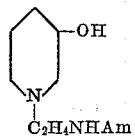

C₂H₄NHAm

| Compound | Am | B.P., °C./mm. | Percent Yield | $N_D^{25}$ | Formula | Assays, Nitrogen Calcd. | Assays, Nitrogen Found |
|---|---|---|---|---|---|---|---|
| 1 | $(CH_3)_2N-$ | 108–109/0.45 | 86.8 | 1.4911 | $C_9H_{22}N_3O$ | 14.95 | 14.93 |
| 2 | piperidino-N- | 128–130/0.07 | 75.8 | | $C_{51}H_{23}N_3O$ | 13.14 | 12.89 |
| 3 | morpholino-N- | 137–138/0.02 | 85.6 | 1.5094 | $C_{11}H_{23}N_3O_2$ | 12.20 | 12.30 |
| 4 | o-Cl-benzyl-N(CH₃)- | 165–170/0.03 | 50.5 | | $C_{25}H_{24}ClN_3O$ | 9.40 | 9.05 |
| 5 | CH₃N-piperazinyl-N- | 136–138/0.02 | 83 | 1.5102 | $C_{12}H_{23}N_4O$ | 17.3 | 16.9 |
| 6 | 3-hydroxypiperidino-C₂H₄NH- | 59–60/0.3 | 13.1 | 1.4954 | $C_{14}H_{30}N_4O_2$ | 14.5 | 13.9 |

Maleate salts of these compounds were prepared for which the following data was obtained:

| Compound | Percent Yield | M.P., °C | Formula | Assays | | | |
|---|---|---|---|---|---|---|---|
| | | | | Nitrogen | | N.E.[1] | |
| | | | | Calcd. | Found | Calcd. | Found |
| 1 | 88 | 115–116 | $C_{17}H_{29}N_3O_9$ | 6.68 | 6.72 | 104.85 | 103.24 |
| 2 | 76.5 | 143–144 | $C_{19}H_{31}N_3O_9$ | 6.28 | 6.25 | 111.31 | 111.84 |
| 3 | 92.9 | 139–140 | $C_{19}H_{31}N_3O_{10}$ | 6.07 | 6.09 | 115.36 | 115.24 |
| 4 | 94.9 | 135–136 | $C_{24}H_{38}N_4O_{13}$ | 7.11 | 7.11 | 98.4 | 95.1 |
| 5 | 73.2 | 127–128 | $C_{15}H_{25}N_3O_9$ | 7.16 | 7.47 | 97.84 | 93.51 |
| 6 | 74 | 126–127 | $C_{26}H_{42}N_4O_{14}$ | 6.62 | 6.48 | 105.7 | 106.7 |

[1] Neutral Equivalent.

EXAMPLE 57

*N'-(N',N'-Disubstituted Amino Ethyl)-Amino-3-Hydroxypiperidines*

The following compounds were also prepared:

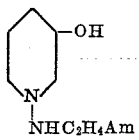

| Compound | Am | B.P., °C./mm. | Percent Yield | Formula | Assays, Nitrogen | |
|---|---|---|---|---|---|---|
| | | | | | Calcd. | Found |
| 1 | $(CH_3)_2N-$ | 88–90° C./0.006 | 78.4 | $C_9H_{21}N_3O$ | 14.95 | 14.64 |
| 2 | pyrrolidinyl-N- | 117–119/0.01 | 80.6 | $C_{11}H_{23}N_3O$ | 13.14 | 13.05 |
| 3 | morpholino-N- | 132–133/0.01 | 81.1 | $C_{11}H_{23}N_3O_2$ | 12.12 | 11.94 |
| 4 | $CH_3$-$CH_2N-$(2-Cl-phenyl) | 165–170/0.01 | 60.0 | $C_{15}H_{24}N_3ClO$ | 9.40 | 9.19 |

Maleate salts of these compounds were prepared for which the following data was obtained:

| Compound | Percent Yield | M.P., °C. | Assays | | | | Formula |
|---|---|---|---|---|---|---|---|
| | | | Nitrogen | | N.E.[1] | | |
| | | | Calcd. | Found | Calcd. | Found | |
| 1 | Hygroscopic[2] | | 6.68 | 6.07 | 105 | 113 | $C_{17}H_{29}N_3O_9$. |
| 2 | 56.6 | 94–95 | 6.28 | 6.25 | 111.31 | 111.65 | $C_{19}H_{31}N_3O_9$. |
| 3 | 74.6 | 120–121 | 6.08 | 6.05 | 115.31 | 114.17 | $C_{19}H_{31}N_3O_{10}$. |

[1] Neutral Equivalent.
[2] Noncrystallizable oil.

EXAMPLE 58

*N-(2-Dimethylaminoethyl)-Amino-3-(N'-Ethyl-3'-Piperidyloxy)-Piperidine*

16.4 g. (0.088 mole) of N-dimethyl-N'-2-(3-hydroxy-piperidino)-ethyl hydrazine 2 g. (0.088 mole) of sodium, and 100 cc. dry toluene were refluxed for two hours. The mixture was cooled slightly and 13 g. (0.088 mole) of N-ethyl-3-chloropiperidine was added. The mixture was refluxed for four hours after which 10 cc. of ethyl alcohol was added to destroy any free sodium. The salt was filtered off, washed with toluene, dried, and weighed 4.3 g. (theory 5.15 g.). The solvent was distilled off through a 4″ Vigreux column, and the residue was vacuum distilled. B.P. 159–162° C. at 0.25 mm.; yield: 13.75 g. or 52.4%; $N_D^{25}$ 1.4820.

*Analysis.*—Calcd. for $C_{16}H_{34}N_4O$: N, 14.07. Found: N, 14.08.

EXAMPLE 59

*N,N-Dimethyl-N'-Acetyl-N'-2-(3-Hydroxypiperidino)-Ethyl Hydrazine*

To 18.7 g. (0.10 mole) of N,N-dimethyl-N'-2-(hydroxypiperidino)ethyl hydrazine, 10.1 g. (0.10 mole) of triethylamine and 100 cc. of dry benzene was added 7.9 g. (0.10 mole) of acetyl chloride. The mixture was refluxed for 90 minutes, clarified by filtration and the filtrate subjected to fractional distillation. The product was collected at 140–142° C. (0.40 mm.); yield; 16 g. (70%); $N_D^{25}$ 1.4888.

*Analysis.*—Calcd. for $C_{11}H_{23}N_3O_2$: N (nonaqueous titration) 6.10. Found: N, 6.08.

EXAMPLE 60

N,N-Dimethyl-N'-2-(3-Acetoxypiperidino)-Ethyl Hydrazine

To 18.7 g. (0.10 mole) of N,N-dimethyl-N'-2-(3-hydroxypiperidino)-ethyl hydrazine in 100 cc. of dry toluene was added 2.3 g. (0.10 mole) of sodium and the mixture stirred and refluxed for two hours. Acetyl chloride (7.9 g.; 0.10 mole) was then added and refluxing continued for 3 hours. A small amount of ethanol was added to destroy any unreacted sodium metal and the mixture clarified by filtration. The filtrate was fractionally distilled. The product was collected at 96–97° C. (0.45 mm.); yield: 7.0 g. (31%).

*Analysis.*—Calcd. for $C_{11}H_{23}N_3O_2$: N (nonaqueous titration), 12.23. Found: N, 12:58.

A higher boiling fraction was then separated:

Yield: 10 g. (44%); B.P. 140–142° C. (0.40 mm.); $N_D^{25}$ 1.4883.

*Analysis.*—Calcd. for $C_{11}H_{23}N_3O_2$: N (nonaqueous titration), 6.10. Found: N, 5.91.

This fraction is, therefore, the N'-acetyl derivative.

Various changes and modifications of the invention can be made and, to the extent that such variations incorporate the spirit of this invention, they are intended to be included with the scope of the appended claims.

What is claimed is:

1. A compound of the group consisting of compounds of the formulae:

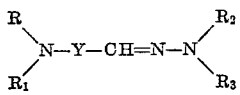

and

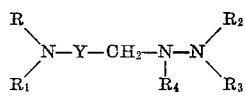

nontoxic pharmacologically acceptable acid addition salts and nontoxic pharmacologically acceptable quaternary ammonium salts thereof of the group consisting of lower alkyl halides, phenyl-lower alkyl halides and di-lower alkyl sulfates, wherein Y is a lower alkylene group, R, $R_1$, $R_2$ and $R_3$ are members of the group consisting of phenyl, lower alkyl, lower alkenyl and groups in which R and $R_1$, and $R_2$ and $R_3$, are joined together to form cyclic secondary amino groups of the group consisting of morpholino, pyrrolidino, piperidino, 1,2,3,4-tetrahydroisoquinolino, 1,2,3,4-tetrahydroquinolino, isoindolino, 4-lower alkyl-1-piperazino, 3-hydroxypiperidino, 4-hydroxypiperidino, 3-(N'-lower alkyl-piperidyloxy)piperidino and 4-(N'-lower alkyl-piperidyloxy)piperidino and $R_2$ and $R_3$ are phenyl-lower alkyl, and $R_4$ is a member of the group consisting of hydrogen and lower acyl from lower aliphatic monocarboxylic acids.

2. N-(Di-lower alkylamino-lower alkylene)-N',N'-di-lower alkyl hydrazine.

3. N-(Di-lower alkylamino-lower alkylene)-amino-1,2,3,4-tetrahydroisoquinoline.

4. N-(Di-lower alkylamino-lower alkylene)-amino-1,2,3,4-tetrahydroquinoline.

5. N-(Di-lower alkylamino-lower alkylene)-amino-isoindoline.

6. N-(2-Pyrrolidinoethyl)-amino - 1,2,3,4 - tetrahydroisoquinoline.

7. N-(2-Pyrrolidinoethyl) - amino - 1,2,3,4 - tetrahydroquinoline.

8. N-(2-Pyrrolidinoethyl)-amino-isoindoline.

9. N-(piperidinoethyl) - amino - 1,2,3,4 - tetrahydroisoquinoline.

10. N - (Morpholinoethyl)-amino - 1,2,3,4 - tetrahydroisoquinoline.

No references cited.

UNITED STATES PATENT OFFICE
CERTIFICATE OF CORRECTION

Patent No. 3,051,707                                                            August 28, 1962

John H. Biel

It is hereby certified that error appears in the above numbered patent requiring correction and that the said Letters Patent should read as corrected below.

Column 3, line 44, for "-N-2-" read -- -N'-2- --; column 7, line 33, for "N titrat-" read -- N(titrat- --; column 8, line 63, for "-(1,2,3,4-", in italics, read -- -(N-1,2,3,4- --, in italics; column 16, line 6, for "-[2-pyrrolidino)-" read -- -[2-(pyrrolidino)- --; line 11, for "40%)" read -- (40%) --; same column 16, line 26, for "Eethylidenyl)-", in italics, read -- Ethylidenyl)- --, in italics; column 18, in the table for "EXAMPLE 56", sixth column, line 1 thereof, for "$C_9H_{22}N_3O$" read -- $C_9H_{21}N_3O$ --; same table, sixth column, line 2, for "$C_{51}H_{23}N_3O$" read -- $C_{11}H_{23}N_3O$ --; same table, sixth column, line 4 thereof, for "$C_{25}H_{24}ClN_2O$" read -- $C_{15}H_{24}ClN_3O$ --;

column 19, line 20, for "N'-(N',N'-", in italics, read -- N-(N',N'- --, in italics; line 74, after "hydrazine" insert a comma; column 20, line 75, for "-2-(hydrox-" read -- -2-(3-hydrox- --.

Signed and sealed this 25th day of December 1962.

(SEAL)
Attest:

ERNEST W. SWIDER                                                DAVID L. LADD

Attesting Officer                                                  Commissioner of Patents